(12) United States Patent
Xu et al.

(10) Patent No.: US 10,082,253 B2
(45) Date of Patent: Sep. 25, 2018

(54) ULTRA-THIN SURFACE MOUNTED LED LAMP HAVING SURFACE EMITTING LIGHT

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Guojun Xu, Zhejiang (CN); Jianguo Dong, Zhejiang (CN); Lei Zhao, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/699,736

(22) Filed: Sep. 8, 2017

(65) Prior Publication Data

US 2018/0073688 A1 Mar. 15, 2018

(30) Foreign Application Priority Data

Sep. 13, 2016 (CN) .......................... 2016 1 0817333

(51) Int. Cl.
| | |
|---|---|
| *F21V 8/00* | (2006.01) |
| *F21K 9/61* | (2016.01) |
| *F21K 9/68* | (2016.01) |
| *F21S 8/00* | (2006.01) |
| *F21Y 105/10* | (2016.01) |

(Continued)

(52) U.S. Cl.
CPC .................. *F21K 9/61* (2016.08); *F21K 9/68* (2016.08); *F21S 8/03* (2013.01); *G02B 6/0016* (2013.01); *G02B 6/0021* (2013.01); *G02B 6/0043* (2013.01); *F21Y 2103/10* (2016.08);

(Continued)

(58) Field of Classification Search
CPC ......... G02F 1/133553; G02F 1/133555; G02F 1/133605; F21K 9/61; F21K 9/68; G02B 6/0043; G02B 6/0021; G02B 6/0016; G02B 6/0011; F21S 8/03; F21Y 2107/10; F21Y 2103/10; F21Y 2115/10; F21Y 2105/10
See application file for complete search history.

(56) References Cited

U.S. PATENT DOCUMENTS

2010/0027256 A1* 2/2010 Kinoshita ................. F21V 5/04
362/235
2012/0140436 A1* 6/2012 Yang ....................... F21V 13/02
362/84

(Continued)

*Primary Examiner* — Joseph L Williams
*Assistant Examiner* — Jose M Diaz
(74) *Attorney, Agent, or Firm* — Wang Law Firm, Inc.

(57) ABSTRACT

An ultra-thin surface mounted LED lamp having surface emitting light includes a house, a light module, a reflection film, a light guide plate, and a plurality of light guide points provided on the light guide plate. The light module is striped and includes a plurality of LED chips. A maximum distance between the two LED chips at a head and tail of the light module accounts for two-thirds of the total circumference of the side walls. The light guide plate includes an incident wall configured for receiving the emitted light of the light module and a reflecting wall configured for reflecting light. A length of the incident wall is equal to the maximum distance between the two LED chips at the head and tail of the light module. The light guide points are spaced apart circular dots, the total area of which is 60% to 65% of the total area of the light guide plate.

9 Claims, 3 Drawing Sheets

(51) Int. Cl.
　　　*F21Y 115/10*　　　(2016.01)
　　　*F21Y 103/10*　　　(2016.01)
　　　*F21Y 107/10*　　　(2016.01)

(52) U.S. Cl.
　　　CPC ....... *F21Y 2105/10* (2016.08); *F21Y 2107/10* (2016.08); *F21Y 2115/10* (2016.08)

(56) References Cited

U.S. PATENT DOCUMENTS

2016/0259122 A1* 9/2016 Negoro ............. G02F 1/133308
2017/0351143 A1* 12/2017 Kadowaki ......... G02F 1/133603
2018/0045878 A1* 2/2018 Murata ................ G02B 6/0083

* cited by examiner

ULTRA-THIN SURFACE MOUNTED LED LAMP HAVING SURFACE EMITTING LIGHT

RELATED APPLICATION

This present application claims benefit of the Chinese Application, CN 201610817333.2, filed on Sep. 13, 2016 with the State Intellectual Property Office of the People's Republic of China, the entire specification of which is incorporated herein by reference.

BACKGROUND

1. Technical Field

The present application relates to a lighting equipment, and more particularly to an ultra-thin surface mounted LED lamp having surface emitting light.

2. Description of the Related Art

For years, people have used traditional incandescent or fluorescence lighting apparatus in order to address their interior lighting concerns. However, such lighting apparatuses present a number of drawbacks. For example, the popular halogen apparatus presents the following drawbacks, such as relatively high power consumption, inefficiency of light dispersion due to the placement of its metal shield in the line sight of the halogen bulb, and its limited effectiveness in preventing glare from the halogen bulb.

Recently, a number of LED lighting apparatuses have been designed to replace the halogen apparatus, as well as other traditional incandescent or fluorescence lighting apparatuses. Especially, the LED lighting apparatuses are used in the super market, exhibition hall, museum, and so on because of long-life and energy-saving thereof. For the increasingly common use of various surface mounted LED lamps, which generally have two requirements, one is thin, and the second is the surface emitting light.

Therefore, it is necessary to provide an ultra-thin surface mounted LED lamp having surface emitting light which makes it possible to meet the above requirements.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
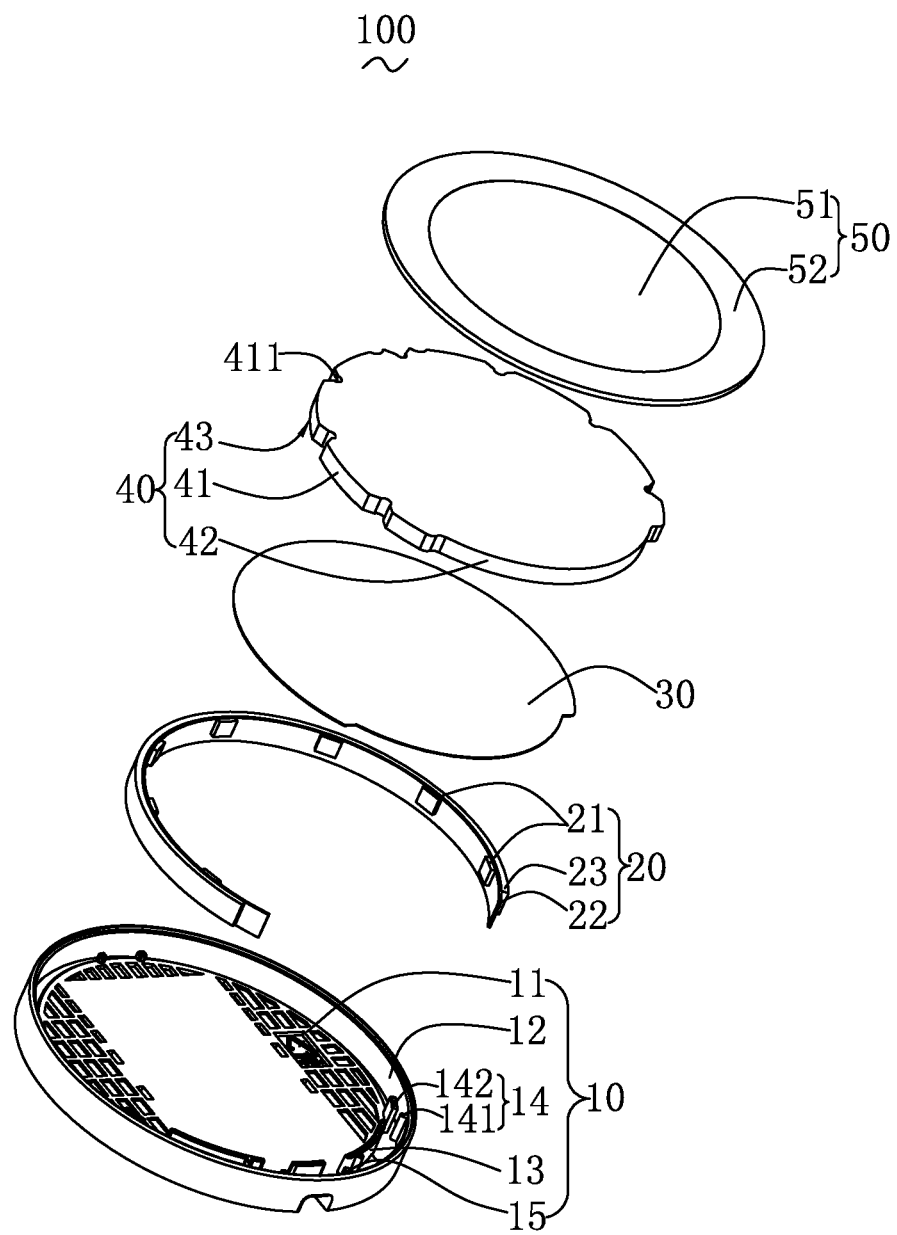
FIG. 1 is an explored view of an ultra-thin surface mounted LED lamp having surface emitting light according to an embodiment.
Figure 2:
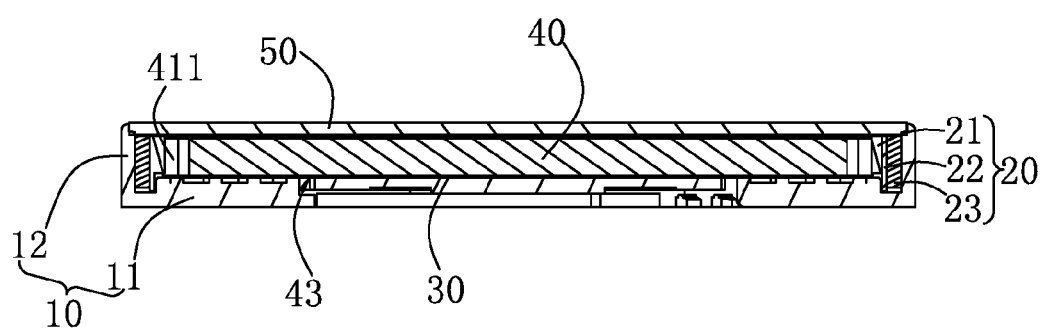
FIG. 2 is a cross-section view of the ultra-thin surface mounted LED lamp having surface emitting light of FIG. 1.
Figure 3:
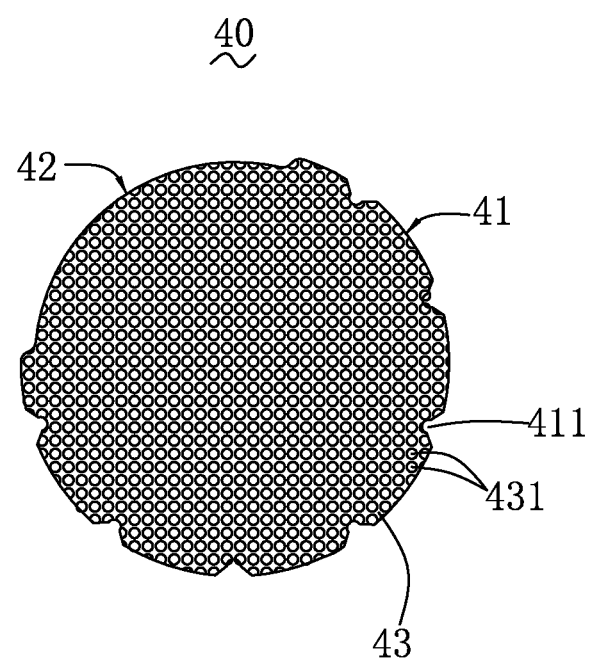
FIG. 3 is a main view of a light guide plate of the ultra-thin surface mounted LED lamp having surface emitting light of FIG. 1.

Referring to FIG. 1 to FIG. 3, an ultra-thin surface mounted LED lamp 100 having surface emitting light is shown. The ultra-thin surface mounted LED lamp 100 having surface emitting light include a house 10, a light module 20 received in the house 10, a reflection film 30 arranged on the house 10, a light guide plate 40 mounted on the house 10, a cover 50 disposed on the light guide plate 40 along the light emitting direction thereof. As well known to a person skilled in the art, the ultra-thin surface mounted LED lamp 100 having surface emitting light further includes other function modules, such as wires subassembly, electrical plug component, installation subassembly, and so on, which no need to described in detail.

The house 10 may be a disc shape and includes a bottom 11, a side wall 12 extending from the bottom 11, an intermittent block portion 13 extending from the bottom 11, and two staggered clamping portions 14 for engaging both ends of the light module 20, respectively. The house 10 usually is not only configured for assembling other functional modules, but also used for heat dissipation. Therefore, the house 10 may be made of thermal materials, such as metal, thermal plastic, and so on. In the present embodiment, the bar house 10 is made of thermal plastic for decreasing cost. The bottom 11 is configured for arranging various parts and is a circle. The side wall 12 is located at the edge of the bottom 11 and forms a closed space for receiving other function modules together with the bottom 11. A height of the side wall 12 is equal to a width of the light module 20. The block portion 13 is spaced apart from the side wall 12 of the house 10. Furthermore, the house 10 includes at least one wire withstanding portion 15 opposite to the gap of the intermittent blocking portion 13. The wire withstanding portion 15 extends from the side wall 12 towards the center of the bottom 11. The wire withstanding portion 15 together with the blocking portion 13 fixes the relative position of the wire subassembly, that is to say, wires are sandwiched between the wire withstanding portion 15 and the block portion 13. The block portion 13 and the stagger clamping portions 14 are provided on the bottom 11 and respectively configured for fixing the light guide plate 20 and the light module 20, whose structure and work principle will be described in detail as follow.

The light module 20 includes a plurality of LED chips 21, a flexible circuit board 22 configured for mounting the LED chips 21, and a heat dissipation bar 23 disposed on the flexible circuit board 22. A light emitting direction of the light module 20 is perpendicular to the side wall 12 of the house 10. The LED chips 21 are solid-state semiconductor device capable of converting electrical energy into visible light, and can directly convert electricity into light energy and have characteristics of energy saving, cold light and small volume which are well known for a person skilled in the art and not are described in detail. A maximum distance between the two LED chips 21 at a head and tail of the light module 20 accounts for two-thirds of the total circumference of the side walls 12. In the present embodiment, the maximum distance between the two LED chips 21 at the head and tail of the flexible circuit board 22 of the light module 20 accounts for two-thirds of the total circumference of the side wall 12. Since the house 10 is a circular, the plurality of LED chips 21 of the light module 20, which is coated on the side wall 12 of the house 10, cannot cover the entire side wall 12. Otherwise interference of light emitted from the plurality of LED chips 21 will be formed. As a result, the main phenomenon is that a middle part is particularly bright and a surrounding part is a little darker, which is not conductive to the formation of a uniform surface emitting light. However, when the maximum distance between the two LED chips 21 at the head and tail of the flexible circuit board 22 accounts for two-thirds of the total circumference of the side walls 12, the above phenomenon can be eliminated so as to obtain the uniform surface emitting light. Moreover, if there are too little LED chips 21 on the flexible circuit board 22, it is not conducive to the formation of uniform surface emitting light. And as a result, a place where the LED chips 21 are disposed will be bright, and the other place will be dark. The flexible circuit board 22 may be a printed circuit board and is used to supply power for each of the LED chips 21. The structure and working principle of the flexible circuit board 22 itself is the prior art and will not be described in detail. A white reflective ink is coated onto the surface of the flexible circuit board 22 in which the LED chips 21 are arranged. The white reflective ink is configured for reflecting the emitted lights of the LED chips 21 back which irradiate onto the flexible circuit board 22 so as to improve light efficiency. The flexible circuit board 22 is attached to the heat dissipation bar 23 and the light module 20 is fixed by means of fixing the heat dissipation bar 23. The heat dissipation bar 23 contacts with the side wall 12 of the house 10 so as to facilitate the heat transfer of the LED chips 21 as much and quick as possible. Therefore, the heat dissipation bar 23 is made of thermal materials, such as metal. Two ends of the heat dissipation bar 23 are respectively clamped in two staggered clamping portions 14 so as to fix the light module 20. As shown in FIG. 1, the staggered clamping portions 14 includes a first abutment portion 141 extending from the side wall 12 and a second abutment portion 142 extending from the bottom 11. The second abutment portion 142 is spaced apart from the first abutment portion 141 and the side wall so as that the heat dissipation bar 23 can be inserted among the first, second abutment portion 141, 142 and the side wall 12. Moreover, the flexible circuit board 22 can extend out from the first, second abutment portion 141, 142 to be electrically connected to the wire subassembly.

The reflection film 30 is configured for reflecting the light irradiated to the bottom 11 of the house 10 to the light guide plate 40. Since the emitted light of the LED chips 21 is non-scattered light, and mostly direct light, it is necessary to disrupt the direct light into scattered light so as to make the light on the exit surface of the ultra-thin surface mounted LED lamp 100 having surface emitting light uniform. Therefore, the reflection film 30 is a diffuse reflective film and is made of a reflective material on paper. The reflective material is subjected to a random coating.

Referring to FIG. 3 together, the light guide plate 40 is mounted on the reflection film 30 and includes an incident wall 41 configured for receiving the emitted light of the light, a reflecting wall 42 configured for reflecting light, and a diffusion surface 43 contacting to the reflection film 30. The light guide plate 40 itself is a prior art and is generally made of an optical grade acrylic/PC sheet and has a thickness equal to the width or the maximum diameter of the LED chip 21. The incidence wall 41 is in close contacted with a plurality of LED chips 21 of the light module 20 to receive light emitted from the LED chips 21. A diffuser groove 411 is provided at a position opposed to each of the LED chips 21 in order to diffuse the emitted light of the LED chips 21 as much as possible to form a surface emitting light. The diffuser groove 411 is of a V-shaped shape and a bottom of the V-shaped shape is circular. An arc length at an open of the V-shaped shape is equal to the length of the LED chips 21 so that the emitted light of the LED chips 21 can all enter into the light guide plate 40. A length of the incident wall 41 is equal to the maximum distance between the head and tail LED chips 21 on the flexible circuit board 22. A reflecting layer 421 may be coated on the reflecting wall 42 and may be a diffuse reflective paper. A plurality of light guide points 431 are provided on the diffusion surface 43 and disposed on the light guide plate 40 and locate between the reflection film 30 and light guide plate 40. The plurality of light guide points 431 are printed on the light guide plate 40 in via of UV (ultraviolet) screen printing technology in use of material with extremely high reflectivity and no light absorption. When light irradiate onto the light guide points 431, the reflected light thereof spreads towards each angle so as to destroy the reflex condition of the diffusion surface 43. Finally, the reflected light is emitted from the exit surface of the light guide plate 40. The light guide plate 40 can have a uniform light emitting surface by providing the degree of density of the light guide point 431 thereon. In the present invention, the light guide points 431 are spaced apart circular dots, the total area of which is 60% to 65% of the total area of the diffusion surface 43 of the light guide plate 40. The light guide plate 40 is sandwiched between the block portion 13 and the second abutment portion 142 of the staggered clamping portions 14 to fix a relative location of the light guide plate 40 along a radial direction thereof.

The cover 50 is arranged in the light emitting direction of the light guide plate 40 and configured to prevent the light guide plate 40 from wearing and form a closed space for assembling the light guide plate 40, and the reflection film 30. The cover 50 includes a light exit side 51 and a light blocking layer 52 connected to the light exit side 51. The light exit side 51 is arranged in the light emitting direction of the light guide plate 40 and has a light transmittance of 100%. The light blocking layer 52 is configured for blocking the light emitted directly from the light module 20. And so, the width of the light blocking layer 52 along the radial direction thereof is equal to the maximum distance of the diffusion groove 411 to the adjacent side wall 12. Moreover, the cover 50 is closely contacted to the light emitting surface of the light guide plate 40 so as to prevent the emitted light of the LED chips 21 from emitting directly from the light exit side 51 of the cover 50.

As described above, the ultra-thin surface mounted LED lamp 100 may have a little thickness and very good light effect so as for increasing the user experience effect by setting the ratio of the light module 20 in the house 10, the structure of the light guide plate 40, the shape and the proportion of the light guide points 431, and the design of the reflective film 30.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ultra-thin surface mounted LED lamp having surface emitting light, comprising:
    a house, the house comprising a bottom and a side wall extending from the bottom;
    a light module received in the house, the light module being striped and comprising a plurality of LED chips, a light emitting direction of the light module being perpendicular to the side wall of the house, a maximum distance between the two LED chips at a head and tail of the light module accounting for two-thirds of the total circumference of the side walls;

a reflection film mounted in the house, the reflection film being a diffusion reflective film and mounted on the bottom of the house;

a light guide plate arranged in the house, an edge of the light guide plate being provided with a diffusion groove at a position opposite to each of the LED chip, the diffusion groove being a V-shaped shape and a bottom of the V-shaped shape being circular, the light guide plate comprising an incident wall configured for receiving the emitted light of the light module and a reflecting wall configured for reflecting light, a length of the incident wall being equal to the maximum distance between the two LED chips at the head and tail of the light module, the reflective wall having a reflecting layer provided thereon; and a plurality of light guide points provided on the light guide plate and sandwiched between the reflection film and the light guide plate, the light guide points being spaced apart circular dots, the total area of which is 60% to 65% of the total area of the light guide plate.

2. The ultra-thin surface mounted LED lamp having surface emitting light as claimed in claim 1, wherein the ultra-thin surface mounted LED lamp further comprises a cover arranged the light emitting direction of the light guide plate.

3. The ultra-thin surface mounted LED lamp having surface emitting light as claimed in claim 2, wherein the cover comprises a light blocking layer provided on an edge thereof, a width of the light blocking layer along the radial direction thereof is equal to the maximum distance of the diffusion groove to the adjacent side wall.

4. The ultra-thin surface mounted LED lamp having surface emitting light as claimed in claim 2, wherein the cover has a light transmittance of 100%.

5. The ultra-thin surface mounted LED lamp having surface emitting light as claimed in claim 1, wherein the light module further comprises a flexible circuit board and a heat dissipation bar mounted on the flexible circuit board, the LED chips and the heat dissipation bar are provide on both sides of the flexible circuit board.

6. The ultra-thin surface mounted LED lamp having surface emitting light as claimed in claim 1, wherein a white reflective ink is coated on a side of the flexible circuit board on which the LED chips are disposed.

7. The ultra-thin surface mounted LED lamp having surface emitting light as claimed in claim 1, wherein a thickness of the light guide plate is equal to the width or maximum diameter of the LED chips.

8. The ultra-thin surface mounted LED lamp having surface emitting light as claimed in claim 1, wherein the house comprises an intermittent block portion extending from the bottom, and two staggered clamping portions for engaging both ends of the light module respectively, the block portion is closely contacted to the reflecting wall, the light guide plate is sandwiched between the block portion and the clamping portions.

9. The ultra-thin surface mounted LED lamp having surface emitting light as claimed in claim 8, wherein the block portion is spaced apart from the side wall of the house, the house further comprises at least one wire withstanding portion opposite to the gap of the intermittent blocking portion, the wire withstanding portion extends from the side wall.

* * * * *